Patented Apr. 16, 1935

1,997,794

UNITED STATES PATENT OFFICE 1,997,794

PREPARATION FOR TREATING THE BOTTOMS OF SHIPS AND THE LIKE FOR DESTROYING ANIMAL AND VEGETABLE MATTER

Isauro Ibáñez, Mazatlan, Mexico

No Drawing. Application June 25, 1931, Serial No. 546,923. In Mexico June 25, 1930

6 Claims. (Cl. 134—41)

My invention relates to an improvement in compositions of matter for the treatment of the bottoms of vessels and generally for the protection of surfaces from the attacks of animal and vegetable matter.

The invention has among its objects to provide a novel composition for this purpose which can be applied with a brush or, if desired, by means of a spray gun.

A further object of the invention is to provide a composition for the purpose specified which will prevent the accumulation of animal and vegetable matter, and which once applied will be effective for long periods of time,—in fact, much longer than any preparations heretofore known or used.

Another object of the invention is to provide a preparation as characterized which incorporates not only a protective or body medium for the hull but also a poisonous ingredient which may remain upon the hands or person of the painter or workman for several hours without any injurious effect whatever yet after such period its action is very strong and effective,—this quality rendering the preparation very efficient in killing animal and vegetable matter which would otherwise adhere to the bottom of a vessel.

In its more limited aspects the invention contemplates the incorporation in the preparation for this purpose of certain novel poisonous ingredients obtainable from certain tropical trees which have in certain instances properties which will burn or destroy animal or vegetable matter after the fashion of an acid and in other instances properties which will kill the same by what might be termed internal poisoning of the subjects whether vegetable or animal.

The invention resides in the combination of ingredients including subcombinations thereof and it is to be understood that the claims appended hereto are to be interpreted to the broadest extent the art will permit.

A preferred example of the invention and which has thus far been found more efficacious than others is set forth as follows:

Boiled linseed oil (bought in the open market already boiled and such as is used in paints)—1000 grams.

A red lead or any other dry color that can be mixed in oil—600 grams.

Yellow beeswax—100 grams.

Rosin or gum (preferably transparent and in powdered form)—100 grams.

Turpentine—200 grams.

Sap of a tropical tree called Iza botanically known as *Prunus rhamnoides,* Kochne.—Familia de las Rosaceas—500 grams.

Sap of a tropical shrub called Candelilla botanically known as *Euphorbia cerifera.*—Familia de las Euforbiaceas—250 grams.

Sap of a tropical tree called Habilla de San Ignacio botanically known as *Hura crepitans.*—Familia de las Euforbiaceas (sometimes called Quanhtlotlatzin or Haba de San Ignacio)—1300 grams.

In carrying out the invention I first heat the rosin and beeswax in a container until the beeswax has been melted into liquid form whereupon the rosin is thoroughly mixed into the beeswax. When this has been accomplished the mixture of rosin and beeswax is poured into the linseed oil and the entire mixture heated until the ingredients are thoroughly mixed.

The saps of the several native trees or shrubs are then added to the mixture of beeswax, rosin, and linseed oil and the same are thoroughly mixed.

After the aforesaid mixture has been accomplished the turpentine which has previously been mixed with the red lead is poured into the vessel containing the other ingredients and the preparation is ready for use.

It is not a prerequisite that the linseed oil, yellow beeswax, and rosin mixture be cooled before the other ingredients are added.

Upon mixing the ingredients as aforesaid, the preparation is ready for use and may be put into cans or the like.

The linseed oil is used for the purpose of giving body to the preparation and as a vehicle,—the linseed oil also having adhesive properties and being thickened by the beeswax which accentuates the adhesive properties of the linseed oil.

The red lead that is used is for the purpose of giving the preparation a wear resisting body and also color.

The turpentine acts as a thinner or drier.

The "Iza" sap is likewise milky and relatively thin. The "Iza" tree is a tropical soft wood tree such as is found in Mexico. This sap will burn the hands and destroy animal and vegetable matter.

The sap from the "Habilla de San Ignacio" tree is of creamy color and about the consistency of milk. Its action upon the hands is very like the action of the "Iza" sap, but is much stronger than the former and much better for my purpose.

The Candelilla sap is very poisonous when taken internally, but is not injurious to the hands or skin of the human body.

The preparation when applied to the bottom of a vessel will effectually keep animal and vegetable matter from forming thereon for a period of six months or more, thus, making it possible for a ship to be kept in service for a long period of time without going into dry dock. With the use of my preparation it is possible to keep a ship out of dry dock and avoid the necessity of cleaning the bottom for a period of eighteen months and oftentimes longer than that.

The mixture can be safely used without injury to the hands inasmuch as the action of the poisonous saps is rendered very slow by the other ingredients, particularly the linseed oil according to my conception.

While the preparation is preferably used including all the ingredients and in the approximate proportions mentioned, yet, the proportions of ingredients can be varied, and certain of them eliminated altogether and still the preparation will produce reasonably good results.

For instance, if the preparation is to be applied by means of a spray-gun there would be an increased amount of turpentine and/or linseed oil used so as to make the composition more fluid.

I may use either paraffin or beeswax or I may dispense with the use of either of these ingredients.

The rosin or gum, which is designed to make the preparation more waterproof, may be eliminated.

The saps of the tropical trees mentioned are preferably all used, although use of Candelilla sap can be eliminated and likewise one or the other of the Iza and "Habilla de San Ignacio" saps may be eliminated and still reasonably satisfactory results obtained. In other words the use of one or the other of the Iza sap or Habilla is necessary, but the use of Candelilla sap while advantageous is not absolutely necessary. Beeswax is considered more desirable to use than paraffin and the "Iza" and "Habilla" saps when used alone, seem to give so nearly the same effect that applicant is unable to decide which appears to be best.

The composition has been proven highly efficient in practical use and from the foregoing description the invention will, it is believed, be readily apparent to those skilled in the art.

Having thus described my invention, what I claim as new and desire to secure by Letters Patent is:

1. The herein described liquid or semi-liquid composition which comprises the mixture of linseed oil and red lead with a poison comprising the sap of a tree such as the Candelilla tree (*Euphorbia cerifera*) and the Iza tree (*Prunus rhomnoides*, Kochne), which are to be found in Mexico, the nature of the saps being such that their action is rendered latent by the oil paint vehicle.

2. The herein described liquid or semi-liquid composition which comprises the mixture of linseed oil and red lead with a poison comprising the sap of a tree such as the Candelilla tree (*Euphorbia cerifera*) and the Iza tree (*Prunus rhomnoides*, Kochne), which are to be found in Mexico, to which is added the sap of the Mexican tree known as the Habilla de San Ignacio (*Hura crepitans*), the nature of the saps being such that their action is rendered latent by the oil paint vehicle.

3. The herein described liquid or semi-liquid composition which comprises the mixture of linseed oil and red lead with a poison comprising the sap of a tree such as the Iza tree, (*Prunus rhomnoides*, Kochne), which is found in Mexico, to which is added the sap of the Mexican tree known as the Habilla de San Ignacio (*Hura crepitans*), the nature of the saps being such that their action is rendered latent by the oil paint vehicle.

4. The herein described composition of matter for the treatment of the bottoms of ships which comprises linseed oil, red lead, yellow beeswax, rosin, turpentine, and the saps of the following tropical trees which are found in Mexico,—to wit, "Iza" (*Prunus rhomnoides*, Kochne), "Candelilla" (*Euphorbia cerifera*) and "Habilla de San Ignacio" (*Hura crepitans*), said ingredients being mixed into a homogeneous mass and being in liquid form, the nature of the saps being such that their action is rendered latent by the oil paint vehicle.

5. The herein described composition of matter which comprises in combination, boiled linseed oil 1,000 grams; red lead capable of being mixed with oil 600 grams; yellow beeswax 100 grams; rosin or gum 100 grams; turpentine 200 grams; the sap of a tree called "Iza" (*Prunus rhomnoides*, Kochne) and found in Mexico 500 grams; the sap of a shrub called "Candelilla" (*Euphorbia ceriferaq* and which is found in Mexico 250 grams; and the sap of a tree called "Habilla de San Ignacio" (*Hura crepitans*) 1300 grams;—such saps being of contrasting poisonous characteristics and the other ingredients herein specified serving to render latent the action of said poisonous ingredients.

6. An anti-fouling composition for the bottoms of ships for preventing the attachment of animal and vegetable matter thereon, which consists of read lead, linseed oil vehicle, the sap of a tropical shrub found in Mexico and called Candelilla (*Euphorbia cerifera*) which is poisonous to animal matter only when taken internally, and also containing the sap of a tropical tree called Habilla de San Ignacio (*Hura crepitans*), a tropical tree found in Mexico and sometimes called Quanhtlotlatzin, which has the property of burning and destroying both animal and vegetable matter,—the nature of said last-mentioned ingredients being such that their action is rendered latent by the oil paint vehicle.

ISAURO IBÁÑEZ.